3,729,488
PREPARATION OF MONOMERIC 2-CYANO-
2-En-BUTYRO LACTONES
Rudolf H. E. Klemke, Sparta, N.J., assignor to
Mohawk Industries Inc., Sparta, N.J.
No Drawing. Filed Oct. 14, 1970, Ser. No. 80,768
Int. Cl. C07d 5/06
U.S. Cl. 260—343.6                    6 Claims

ABSTRACT OF THE DISCLOSURE

Monomeric 2-cyano-2-enbutyrolactones are prepared for use as adhesive compositions in bone and like surgery.

---

This invention relates to the preparation of monomeric 2-cyano-2-en-butyrolactones, also known as alpha-cyano angelica lactones, for use as adhesive compositions in bone and like surgery.

In the prior art, U.S. Pat. Nos. 2,721,858 and 2,763,677 dated Oct. 25, 1955 and Sept. 18, 1956, disclose the use of monomeric alpha-cyano acrylates as fast curing adhesives hardening by traces of moisture on surfaces. It is noted, however, when used as an adhesive in bone surgery there is a disadvantage of toxic reactions resulting apparently because of the biodegradation of the adhesive. It is believed that the biodegradation products are formaldehyde and a cyano acetic ester. Alkyl alpha cyano acrylate adhesives are slowly degraded in the body and removed from the site of application. $^{14}$C-tracer studies on animal implantation showed that the methyl polymer was degraded more rapidly than the higher esters, and that no degradation products were stored in the tissue. It is believed that the toxicity results from formation of formaldehyde and a cyanoacetate. It has been suggested that main chain hydrolysis occurs, catalyzed by OH$^-$.

There are reports where macromolecular substances are used in medicine to replace soft tissue, or possibly in dental work for filling cavities or hardening surfaces of teeth, cf. G. W. Hastings, "Macromolecular Chemistry and Medicine"—Angewandte Chemie, International Edition in English, volume 9, No. 5, May 1970, pages 332 to 334.

Further degradation is expected to yield cyanic esters as further products. It is argued that lower concentrations of these toxic products are given by the less rapid degradable higher esters, and that this accounts for their lower toxicity. The less toxic isobutyl ester is currently being evaluated for clinical use. These higher alkyl apha-cyano acrylates, however, are increasingly difficult to polymerize as the length of the alpha-alkyl group ($C_2$ to $C_{10}$) increases.

According to my invention, I synthesize a stable five membered lactone ring, having a cyano-group and a double bond in alpha position, which avoids the clinical disadvantages of the acrylic compounds in the above noted patents. In the present case there is formed a stable five membered ring system, in which case the corresponding free 2-cyano-pentadien-(2,4)-acid-1.

In connection with the experimental work done, I found another interesting matter in contradistinction, to the literature. It is generally believed that no Knoevenagel condensation is possible with acrolein, because the double bond always is favored to react prior to the carbonyl group, when reacted with active methylenic compounds, as shown in U.S. Pat. 2,599,653, U.S. Pat. 2,546,960, J. Am. Chem. Soc. 70, 2765 (1948), J. Am. Chem. Soc. 70, 3470 (1948), etc.

Using alpha-cyanoacetic acid and acrolein, I found that a normal Knoevenagel condensation is only possible when applying the narrow pH range of 11.0 to 11.2 prior to reaction and keeping the reaction temperature around 0 degrees C. and +12 degrees C., preferably between +5 degrees C. and +8 degrees C. In this manner, yields greater than 85% could be obtained. However, the polymerization tendency of the formed 2-cyano-2-enpentadien acid-1 is so great that only its polymer sodium salt could be obtained:

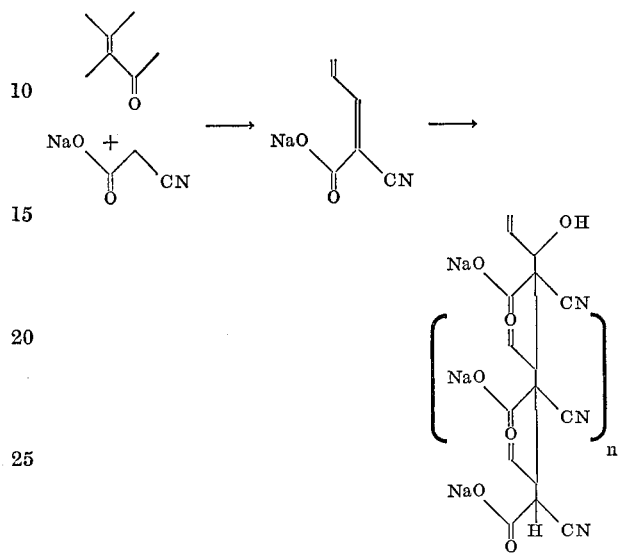

On acidifying this polymer sodium salt, it immediately undergoes ring closure to the corresponding polymer lactone:

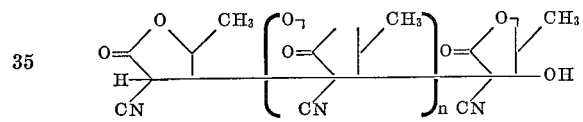

which can be depolymerized according to known procedures to the monomer 4-methyl-2-cyano-2-en-butyrolactone-1:

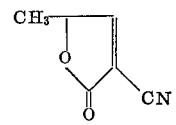

In order to study the influence of pH range on yield, crotonealdehyde was used instead of acrolein. Surprisingly, the reaction product between alpha-cyanoacetic acid and crotonealdehyde yields the monomer 2-cyanohexadiene-2,4-acid-1 in the form of yellow crystals. Below pH 10 and above pH 11.8, the yields sharply decrease and that the reaction products below pH 10 are mainly according to the literature whereas they are polymer tars above pH 12.0.

Other theoretically possible ways were investigated to open the door into the 5 membered lactone ring system having a cyano group and a double bond in alpha-position. However, the yields were low and of no industrial value. This was, for example, the case when reacting glycol aldehyde with alpha-cyano acetic acid or its esters:

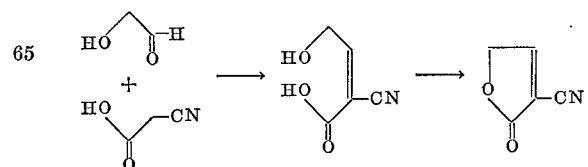

The low yields are probably due to the following isomerization of glycol aldehyde under the conditions used, so that only poor Knoevenagel condensation is possible, and the main reaction goes according to the literature.

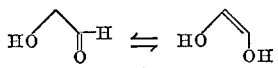

The monomeric 4-methyl-2-cyano-2-en-butyrolactone-1 prepared in accordance with this invention is an excellent adhesive composition for bonding almost any type of material to itself, or to a dissimilar material. The adhesive composition is readily employed by merely spreading it in a thin film on the surface to be bonded. Polymerization occurs within a few seconds without the use of either heat or a polymerization catalyst, and the bonds which are obtained are of a very high strength.

The advantages of the process embodying this invention are illustrated in the following examples, which are not intended to limit the scope of this invention, but are illustrative.

EXAMPLE 1

85.0 g. (=1.0 mol) of cyano acetic acid in 500 ml. of water, 40.0 g. (=1.0 mol) NaOH in 40 ml. of water, were mixed and blended together while cooled by an ice bath. The formed solution of the sodium salt of alpha-cyanoacetic acid was pH adjusted to pH 11.0–11.2 by use of 20 g. of 10% NaOH. This mixture was cooled to 0 degrees to +5 degrees C. by means of an ice/NaCl bath and 61.5 g. (=1.1 mol) acrolein stabilizer: hydroquinone were slowly added below +10 degrees C. This operation requires about 30 minutes, during which the pH was carefully checked to be kept always at 11.0–11.2 when all of the acrolein was added. The agitation was continued for an additional 1½ hours, and 400 ml. of 10% sulfuric acid were slowly added under cooling, causing no precipitation of any crystals. After three (3) hours of standing in a freezer, followed by vacuum filtration, about 1.0 g. of white crystals could be obtained, identified as hydroquinone. The formed low polymer of 2-cyano-angelica lactone is very water soluble. After undercooling this solution to −5 degrees C. in a freezer, a sudden crystallization took place of very fine, silky needles of sodium sulfate. On trying to distill the water, off at 100 degrees C. polymerization continued forming a water insoluble higher polymer. Another part of the original filtrate of the light yellow water solution, therefore was neutralized with sodium carbonate and then extracted two times with 50 ml. of ethylacetate each, the solvent solution dried over magnesium sulfate, filtered and the solvent evaporated by vacuum distillation without any heat but at room temperature. The residue was a slightly straw-yellow, glass-clear and tough polymer.

The rest of the semi-dry and neutral ethylacetate solution was placed in a 3-necked round-bottomed flask, together with 10 ml. of tricresylphosphate equipped with a mechanical stirrer, thermometer and a distillation bridge. After having distilled off most of the solvent, 150 ml. of benzene were added, and the remainder of ethylacetate, as well as traces of remaining water was azeotroped off over a period of one (1) hour. The solution was allowed to cool slightly before adding some $P_2O_5$ and some hydroquinone. The remainder of the benzene was then distilled off under a partial vacuum while sulfur dioxide was bled into the system through a capillary. After the benzene had been removed, the system was connected to a mechanical pump, and crude monomer was vacuum distilled at about 2.5 mm. Hg over a boiling range of 80 degrees–200 degrees C. The sample was too small to measure the yield exactly; therefore, it was decided to run the experiment only qualitatively. The crude monomer was then redistilled in the same way. Before redistillation, some hydroquinone and $P_2O_5$ were added and the fraction obtained at 70–75 degrees C. at 2 mm. Hg was collected.

EXAMPLE 2

In a one-liter, round-bottomed flask, equipped with a mechanical stirrer, thermometer and dropping funnel were placed 85.0 g. (=1.0 mol) cyanoacetic acid in 200 ml. of water, the solution cooled to +5 degrees C. and a cold solution of 40 g. equal to 1.0 mol NaOH in 40 ml. water slowly added that the temperature never raised above +10 degrees C. In order to adjust the pH to 11.0 some 20 g. of a 10% NaOH were added. This mixture was cooled to 0 degrees–+5 degrees C. again before adding slowly through the dropping funnel 56.0 g., equal to 1.0 mol of acrolein. During the addition of acrolein, the pH was checked carefully to be always at 11.0 and the temperature was carefully kept between +5 degrees C. and +10 degrees C., which is one of the critical moments of this preparation. After having added all of the acrolein, stirring is to be continued at +5 degrees C. for 1½ hours, after which time under ice cooling, 400 ml. of cold 10% sulfuric acid were added. If these operations are being carried out carefully, no trace of any polymer product was obtained, but a somewhat cloudy, light yellow water solution. The cloudiness is due to the stabilizer hydroquinone from the acrolein used. If not, a side reaction will occur which involves a head-to-tail polymerization of the butadiene system, resulting in a polymer with free carboxylic groups. On warming, these groups will decarboxylate under generation of carbon dioxide.

After three (3) hours standing at about 0 degrees to +5 degrees C. the hydroquinone can be removed by vacuum filtration. After having neutralized the filtrate with sodium carbonate when cooled to −5 degrees C. and touched by a tool as a thermometer, a sudden crystallization delivered all sodium sulfate formed during the process, which was separated by vacuum filtration. After having checked the pH of the filtrate, which has to be 7.0–7.2 degrees F. in order to succeed with the following operation, the slightly straw-yellow water solution was extracted twice with 100 ml. of ethylacetate, the solvent solution separated and dried over magnesium or sodium sulfate, filtered and prior to addition of 15 g. of tricresylphosphate, pH adjusted to pH 7.2–7.4 with some piperidine. The solvent was then removed by distillation. 200 ml. of benzene were then added and the remainder of ethylacetate, as well as remaining traces of water was azeotroped off over a period of about 90 (ninety) minutes. This is another critical point during the process: excessively fast distillation of the benzene gives a residue still not as completely dry as necessary, which would decrease the yield of the end product sharply. The solution was allowed to cool slightly before adding 5.5 g. of $P_2O_5$ and 4.0 gms. of hydroquinone. The apparatus was then made ready for vacuum distillation to distill off the remainder of benzene under a partial vacuum while sulfur dioxide was bled into the system through a capillary. After the benzene had been removed, the system was connected to a mechanical pump and the crude monomer was vacuum distilled between 1–2 mm. Hg over a boiling point range of 80 degrees–200 degrees C. The yield of the crude monomer was 97.5%. This crude monomer was then redistilled over a small column loosely packed with freshly prepared copper tinsel and while bleeding in sulfur dioxide. Before redistillation, 0.5% by weight of hydroquinone and 1% of $P_2O_5$ were added to the crude monomer, and the fraction obtained at 70–75 degrees C. and 1.6 mm. Hg was collected. A 79% yield of redistilled product was obtained.

EXAMPLE 3

Just as it is the case with alpha-cyanoacrylates, also here could be illustrated the necessity of adding the acidic polymerization inhibitor to the reaction mixture before removal of all of the solvent. The process described in Example 2, was repeated with the exception that the hydroquinone and the $P_2O_5$ were not added to the polymeric product until after the benzene had been entirely removed under vacuum. In this case, the polymer decomposes with some foaming and no monomer was obtained.

EXAMPLE 4

The process described in Example 2, was also carried out in pyridine as the solvent instead of water, which is, however, of no advantage over the water system.

Since the polymers prepared in accordance with this invention melt readily at a temperature of 80–100 degrees C. and are of tough, physical properties, it is suggested to use their dried ethylacetate solution, perhaps in connection with other solvents, for example, as a paint base material. The excellent adhesion characteristics to all kinds of materials demonstrate such utilization.

From the foregoing, it will be noted that the invention has been described in considerable detail with particular reference to certain preferred embodiments thereof, but it should be understood that variations and modifications can be made within the spirit and scope of the invention as described here above, and as defined in the hereinfollowing appended claims.

What is claimed is:

1. The method of preparing a 2-cyano-2-en-butyrolactone-1 comprising reacting $\alpha$ and $\beta$ unsaturated aldehydes with cyanoacetic acid according to Knoevenagel condensation at a temperature range between 0 degrees C. to 12 degrees C. and at a pH range between 10–12, acidifying to form a polymer $\alpha$ cyano derivative of $\alpha$ angelica lactone, then depolymerizing to a monomeric compound having the general formula:

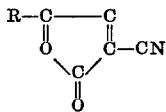

wherein R is H or a methyl group.

2. The method according to claim 1, wherein said polymer is subjected to azeotropic distillation to form a dry polymer, then adding a polymerization inhibitor admixed with a non-aqueous organic solvent, separating said non-aqueous solvent from the resulting lactone and finally depolymerizing the resulting lactone.

3. The method according to claim 1, wherein the used $\alpha$, $\beta$ unsaturated aldehyde is acrolein and the resulting monomer is 4-methyl-2-cyano-2-en-butyrolactone-1.

4. The method according to claim 1, wherein the condensation is carried out at pH 11.0–11.2 and at low temperature and wherein the polymerization inhibitor is an acidic one.

5. The method according to claim 4, wherein the depolymerization is carried out in the presence of an antioxidant, said antioxidant being hydroquinone in combination with an acidic polymerzation inhibitor, said inhibitor being $P_2O_5$ and gaseous sulfur dioxide.

6. The method according to claim 5, wherein the $P_2O_5$ and hydroquinone are added prior to removal of all of the solvent and wherein the depolymerization being effected by heating said polymeric 4-methyl-2-cyano-2-en-butyrolactone-1 under reduced pressure in the presence of said $P_2O_5$ and said hydroquinone thereby evolving vapors of monomeric 4-methyl-2-cyano-2-en-butyrolactone-1 and then admixing said vapors with a gaseous acidic polymerization inhibitor.

References Cited
UNITED STATES PATENTS 3,468,912    9/1969    Ford et al. _____ 260—343.6

ALEX MAZEL, Primary Examiner

A. T. TIGHE, Assistant Examiner

U.S. Cl. X.R.

260—465.4, 67; 424—279